Jan. 13, 1959   A. P. GIRAITIS   2,868,621
METHOD OF MAKING METAL HALIDES
Filed Aug. 31, 1953
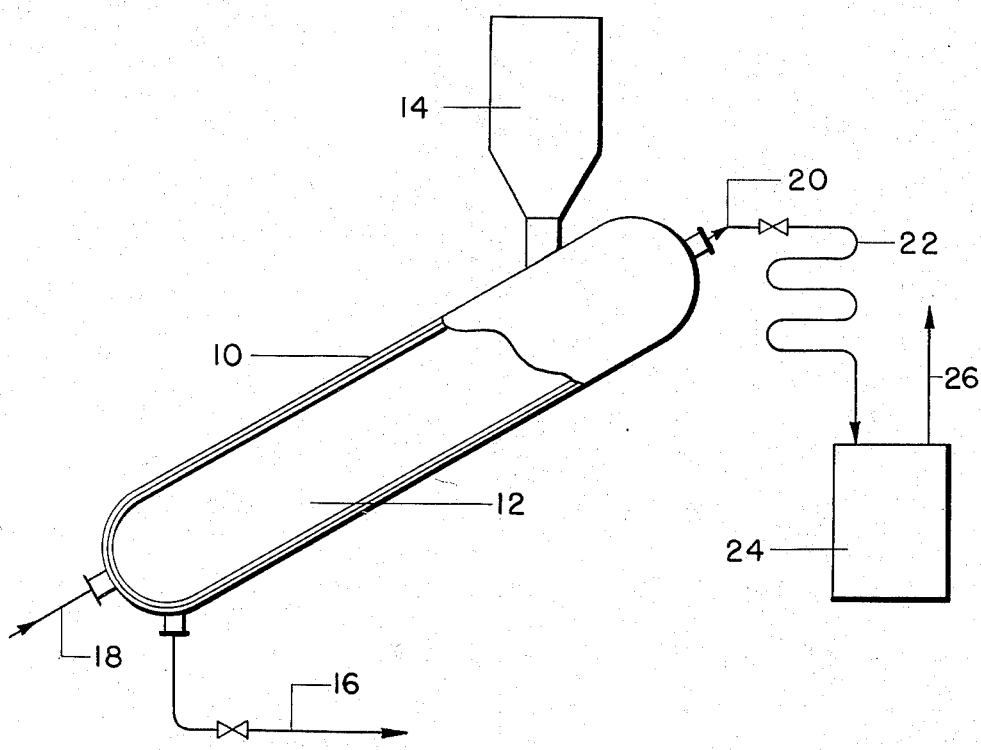
INVENTOR.
ALBERT P. GIRAITIS
BY *Kenneth Swartwood*
HIS ATTORNEY

2,868,621

METHOD OF MAKING METAL HALIDES

Albert P. Giraitis, Baton Rouge, La., assignor to Ethyl Corporation, New York, N. Y., a corporation of Delaware Application August 31, 1953, Serial No. 377,395

2 Claims. (Cl. 23—87)

This invention relates to the preparation of metal halides, more particularly such halides that are readily fused or vaporized. The present application is in part a continuation of copending application, Serial No. 208,527, filed January 30, 1951, now Patent No. 2,698,347, granted December 28, 1954.

Among the objects of the present invention is a novel method for preparing halides in an inexpensive manner.

The above as well as additional objects of the present invention will be more clearly understood from the following description of several of its exemplifications, reference being made to the accompanying drawing in which:

The figure is a schematic showing of one way to carry out the method of the present invention.

Applicant has discovered that metal halides are readily prepared from the halogen content of a halide of a different metal where the last mentioned halide becomes fluid at a temperature higher than that at which the desired halide does. It is only necessary to heat together the starting halide with a halogenatable source of the metal of the desired halide and with sulfur trioxide at a temperature at which the desired halide is fluid and is in a different phase from that of the starting halide. The desired halide is thereby formed and is readily separated from the reaction mixture. The fluid product can be separated as a liquid or as a vapor.

As one example of the process of the present invention, in which the desired product is a vapor, sodium chloride is mixed with titanium dioxide in a 3:1 molar ratio and the mixture placed in a ceramic-lined reaction container equipped with a heat exchange jacket and a gas inlet and outlet. The mixture is heated to 250° C. and sulfur trioxide gas then led into the reaction containers. As soon as the sulfur trioxide contacts the hot solids, vapors begin to come off and emerge from the gas outlet. From these vapors anhydrous titanium chloride can be condensed with an air condenser. In the container the reaction mixture gradually liquefies.

In the reaction the sulfur trioxide apparently displaces the chlorine from the sodium chloride, and the chlorine chlorinates the titanium dioxide. The final reaction product in the container is a sodium sulfate containing loosely bound excess sulfur trioxide.

Instead of the sodium chloride in the above example, other halides, such as calcium chloride, potassium chloride, magnesium chloride, zinc chloride, manganese chloride, nickel chloride, chromium chloride, and in fact any other metal chloride, can be used. Some of these chlorides, such as calcium chloride, are not liquefied during the reaction but are converted to solid products that are not easily fusible.

The temperature range in which the reaction of the present invention takes place extends from about 200° C. to as high as 650° C. or even higher. The operating temperature, however, is dictated by the characteristics of the particular reactants to assure that the desired separation of phases can be effected. Thus, where it is desired to prepare ferric or ferrous chloride, the reaction temperature, which should be high enough to vaporize the desired product if it is to be recovered as a gas, would be substantially higher than needed to make titanium tetrachloride or stannic chloride, for example. For titanium chloride a temperature of from 200 to 300° C. can be used. The reaction temperatures can also be changed by suitable adjustment of the pressure under which the reaction is carried out.

According to a different phase of the present invention the reaction can be carried out to produce the desired halide as a liquid instead of a gas. For this type of operation the halide used as a starting material is preferably one that will remain solid or as a phase distinct from that of the desired product.

Aluminum bromide and aluminum chloride can conveniently be prepared by this technique. As starting materials for aluminum bromide, calcium bromide, aluminum oxide, and sulfur trioxide can be used, a reaction temperature of 230° C. being very suitable. Convenient starting materials for aluminum chloride manufacture are aluminum or aluminum oxide, sodium chloride, and sulfur trioxide. The reaction mixture is preferably held in a reaction zone arranged to permit the aluminum halide to run down and collect as a pool separated from the reaction mixture. The pool can have a separate outflow line for removal of the product during the progress of the reaction, or the product can be separately removed after the reaction is completed. Any other readily liquefied metal halide can also be prepared in this way.

Instead of using as a reactant an oxide of the metal desired to be halogenated, any other halogenatable source, such as the free metal, hydroxides, or carbonates, and unstable compounds, such as sulfites, nitrates, and nitrites, can be substituted. Where the reaction involves an oxidation, as when the free metal is the reactant being halogenated, some of the sulfur trioxide is converted to sulfur dioxide, which discharges from the reaction mixture. This sulfur dioxide can be reoxidized to sulfur trioxide as by the conventional contact process and then reused for additional halogenation.

The figure shows one type of apparatus that can be used for either of the above types of reactions. A reaction container is shown as an inclined reactor tank 10 provided with suitable heating means (not illustrated) and an interior lining 12. Near the top of the reactor 10 is a feeding device 14, such as the conventional feed hopper and screw conveyor, which is connected for continuously or intermittently introducing the solid reactants into the reaction zone. At the bottom of the reactor a drain line 16 is provided to collect and draw off any liquid that is formed during the reaction. Near the bottom there is also provided an inlet line 18 through which sulfur trioxide in gas form is supplied.

A discharge line 20 is connected near the top of the reactor to vent any vapors formed during the reaction. Where the vapors contain some of the desired product, the line 20 can be led to a condenser 22, which can be air- or liquid-cooled, and from there to a receiver 24 having its own vent 26. Where any vapors given off during the reaction are not to be recovered, the line 20 can merely be open to the atmosphere.

The solid reactants are preferably mixed in the desired proportion for introduction into the reactor 10, and after they are brought to reaction temperature the sulfur trioxide stream is begun. Where sodium chloride or similarly behaving halides are used as the halogen-supplying reactant, the solids in the reactor gradually become liquefied, the liquid running down the tank walls to the drain line 16. Suitable valves may be provided to control the drawing off of the liquefied material, as well as the introduction of sulfur trioxide. Where the reaction is to be carried out under superatmospheric pressures, a pressure reducing valve should also be provided in discharge line 20 and/or vent line 26. With such a construction the feeding unit 14 should be sealed against loss of pressure, as by providing it with a gas lock. It is also advisable, particularly where a superatmospheric pressure is to be maintained in tank 10, to supply an inert blanketing gas such as nitrogen to the feeding unit 14, and arranging so that this gas flows through the feeding unit and out into the tank. This will reduce the tendency for the reaction to take place in the feeding unit where it might result in the formation of feed obstructions.

The reaction mixture can be introduced into reactor tank 10 in any desired amounts. The charge can be sufficient to just cover the lower portion of the tank's inclined wall, or it might be introduced in such large amounts as to practically fill the entire reactor below the level of the feed unit.

Where the desired product is to be recovered in liquid form, it is drawn off by line 16 and can be directly cast into blocks or plates or can be reduced to relatively small particles, as by the use of a flaking machine. Thus, for example, the liquid can be dropped onto a rotating cooling drum provided with knife-like scrapers. The liquid is arranged to solidify on the drum, and the scrapers then scrape off the solidified material, at the same time breaking it up into small particles.

Other forms of apparatus can also be used to carry out the process of the present invention. By way of example, reactor 10 can be provided with an internally fitted conveyor screw to move the reactants through the reaction zone. This type of construction is particularly suited for reactions which leave a solid by-product such as the above-mentioned calcium sulfate. Such solid materials can also be treated to recover reuseable sulfur trioxide, if desired.

The above reactions are also useful for making metal iodides. These are formed with about the same readiness as the chlorides and bromides. Thus, zinc iodide and lead iodide are conveniently prepared in accordance with the present invention using zinc and lead oxide respectively, with sodium iodide and potassium iodide as the respective halogen-supplying materials.

In accordance with the present invention it is also possible to directly prepare free chlorine, bromine, or iodine from a metal halide and sulfur trioxide. This is accomplished by merely omitting the halogenatable source so that the reaction is essentially a substitution of $SO_3$ for the halogen of the halide. The liberated halogen is recovered from the gases discharging through line 20.

As a modification of this last mentioned process, hydrogen chloride can be used in place of the metal halide reactant and be directly converted to free chlorine. This conversion is effected by introducing a mixture of hydrogen chloride and sulfur trioxide into a liquid reaction mixture of the type referred to above in connection with the preparation of the fluid metal halides.

In other words, where a sodium or potassium halide is reacted to form a more fluid metal halide, a molten $SO_3$-containing alkali metal sulfate is formed. To this liquid material a catalyst such as an iron, mercury, or copper compound can be added, after which the bubbling of the $SO_3$ and HCl through the catalyst-containing mixture will directly produce free halogen. For this reaction the effective temperature range is substantially that described above.

There appears to be no limit to the type of iron, mercury, or copper compound that can be used as a catalyst. Inorganic or organic compounds of these metals, including halides, sulfates, oxides, acetates, etc., are effective. Even the free metals can be used since they are gradually converted into active material in the reaction zone. As little as 1 percent of such catalyst compound based on the weight of the liquid sulfates by-product is sufficient.

The reaction itself appears to be a straight forward oxidation of the hydrogen chloride to chlorine, the sulfur trioxide being simultaneously reduced to sulfur dioxide. It is preferred, however, to use an $SO_3$ to HCl ratio somewhat in excess of the stoichiometric one. About equimolecular proportions make a very suitable reaction mixture.

The free halogen production can be carried out with the liquid by-product of a metal halide preparation operation as a subsequent step using the same apparatus, for example. Instead of following a metal halide production step it can be used with the liquid by-product of the organic halide-producing step disclosed in the above identified parent application as well as in applicant's copending application, Serial No. 357,860, filed May 27, 1953, now U. S. Patent 2,821,560, issued January 28, 1958, particularly where the liquid by-product of the latter application contains the required iron, mercury, or copper catalyst. Alternatively, the catalyst-containing liquid can be specially prepared for the halogen production. The last mentioned case lists specific examples of suitable catalysts.

In the production of free halogen, improved yields are obtained if the reaction temperature is kept down to about 250° C. and also if the reaction is carried out under superatmospheric pressure. Pressures of up to 50 pounds per square inch are desirable for this purpose. Preferably, the halogen material formed in the present invention is one whose halogen has atom weight at least 35.5.

As many apparently widely different embodiments of this invention may be made without departing from the spirit and scope hereof, it is to be understood that it is not limited to the specific embodiments hereof except as defined in the appended claims.

What is claimed is:

1. A method of making titanium tetrachloride, which method comprises selecting the chloride of a different metal, the selected chloride being one that becomes fluid at a temperature higher than the titanium tetrachloride, reacting together sulfur trioxide with said selected chloride and titanium dioxide at a temperature between 200 and 650° C. and at a pressure at which the titanium tetrachloride is a vapor and the selected chloride is not, and physically separating the titanium tetrachloride vapor from the reaction mixture.

2. A method of making a readily fused halide of a metal selected from the group consisting of titanium, iron, aluminum, tin, zinc and lead with the halogen content of a corresponding halide of a second metal, which method comprises selecting a second metal halide that becomes fluid at a temperature higher than the desired metal halide, reacting together sulfur trioxide with said selected metal halide and the oxide of a metal selected from the group consisting of titanium, iron, aluminum, tin, zinc and lead, conducting the reaction at a temperature between 200 and 650° C. and at a pressure at which the desired halide is fluid and is in a different phase from that of the second metal halide, and physically separating the desired metal halide phase from the reaction mixture.

References Cited in the file of this patent

UNITED STATES PATENTS

| | | |
|---|---|---|
| 1,312,743 | Moeys | Aug. 12, 1919 |
| 2,276,079 | Maude | Mar. 10, 1942 |
| 2,375,000 | Iler | May 1, 1945 |
| 2,401,644 | Iler | June 4, 1946 |
| 2,486,572 | Olson | Nov. 1, 1949 |
| 2,547,928 | Davis et al. | Apr. 10, 1951 |
| 2,608,464 | Aagaard et al. | Aug. 26, 1952 |
| 2,626,203 | Blumenthal | Jan. 20, 1953 |
| 2,701,180 | Krehma | Feb. 1, 1955 |

OTHER REFERENCES

J. W. Mellor's "A Comprehensive Treatise on Inorganic and Theoretical Chem.," vol. 10, 1930 ed., pp. 344–347, Longmans, Green and Co., New York, N. Y.